United States Patent
Taheri (10) Patent No.: US 6,217,216 B1
(45) Date of Patent: Apr. 17, 2001

(54) RECLOSABLE PLASTIC BAG WITH NON-PERFORATED TEAR ZONE

(76) Inventor: Nossi Taheri, 1220 Regency Rd. NW., Atlanta, GA (US) 30327

( * ) Notice: Subject to any disclaimer, the term of this patent is extended or adjusted under 35 U.S.C. 154(b) by 0 days.

(21) Appl. No.: 09/422,696

(22) Filed: Oct. 21, 1999

Related U.S. Application Data (63) Continuation-in-part of application No. 08/604,851, filed on Feb. 22, 1996, now abandoned.

(51) Int. Cl.[7] .................................................. B65D 33/00
(52) U.S. Cl. ............................... 383/207; 383/63; 383/66
(58) Field of Search ............................. 383/5, 201, 207, 383/208, 209, 63, 61, 40, 39, 66, 203

(56) References Cited

U.S. PATENT DOCUMENTS

| | | |
|---|---|---|
| 3,181,583 | 5/1965 | Lingenfelter . |
| 3,226,787 | 1/1966 | Ausnit . |
| 3,312,339 | 4/1967 | Million . |
| 3,338,284 | 8/1967 | Ausnit . |
| 3,385,428 | 5/1968 | Kugler . |
| 3,462,332 | 8/1969 | Goto . |
| 3,473,589 | 10/1969 | Gotz . |
| 3,625,270 | 12/1971 | Skendzic . |
| 3,679,511 | 7/1972 | Ausnit . |
| 3,685,562 | 8/1972 | Ausnit . |
| 3,780,781 | 12/1973 | Uramoto . |
| 3,846,209 | 11/1974 | Howard . |
| 3,852,386 | 12/1974 | Behr . |
| 3,889,871 | 6/1975 | White . |
| 3,904,468 | 9/1975 | Noguchi . |
| 4,101,355 | 7/1978 | Ausnit . |
| 4,241,865 | 12/1980 | Ferrell . |
| 4,279,677 | 7/1981 | Takahashi . |
| 4,290,467 | 9/1981 | Schmidt . |
| 4,295,915 | 10/1981 | Sakaguchi et al. . |
| 4,306,924 | 12/1981 | Kamp . |
| 4,428,788 | 1/1984 | Kamp . |

(List continued on next page.)

FOREIGN PATENT DOCUMENTS

| | | |
|---|---|---|
| 38-18345 | 11/1935 | (JP) . |

OTHER PUBLICATIONS

Brochure by ITW Minigrip, Inc. for the "minigrip", 1988.

*Primary Examiner*—Jes F. Pascua
(74) *Attorney, Agent, or Firm*—Gardner & Groff, P.C.

(57) ABSTRACT

The present invention provides reclosable plastic bags that a laboratory worker wearing gloves can open safely without the use of any tool or utensil and without increasing the risk of contact between the contents of the bag and the user. The reclosable plastic bags of the present invention may be made from an extruded plastic bag film web that may be cut or otherwise formed into a bag comprising a first wall on which a first closure profile element is disposed and a second wall on which a second closure profile element is disposed. On either wall or both walls, below the closure profile element, the plastic film web may be formed into subsections having different thicknesses. One of the subsections may be thinner cross-section, formed of a thinner bag film web, thus creating a "tear zone" that may have a substantially linear, not substantially cross-linked, molecular alignment. A sufficient distance from the centerline of that thin subsection, on either side or both sides of the thin subsection, one or more strips may be formed of sufficient mass, weight, or strength to reduce at least partially the lateral forces that might otherwise act in or on the thin section during extrusion to cause unacceptable wrinkling of the thin section and/or surrounding sections. The present invention also provides apparatus, die assemblies, and methods for manufacturing the reclosable plastic bags of the present invention. The present invention further provides reclosable closure profiles that create a partial seal substantially preventing a closure profile element from contacting either the contents of the bag or the ambient air or moisture.

20 Claims, 5 Drawing Sheets

U.S. PATENT DOCUMENTS

| | | |
|---|---|---|
| 4,484,352 | 11/1984 | Katzin . |
| 4,522,678 | 6/1985 | Zieke . |
| 4,555,282 | 11/1985 | Yano . |
| 4,557,384 | 12/1985 | Membrino . |
| 4,582,549 | 4/1986 | Ferrell . |
| 4,589,145 | 5/1986 | Van Erden et al. . |
| 4,620,320 | 10/1986 | Sullivan . |
| 4,630,311 | 12/1986 | Bentson . |
| 4,672,723 | 6/1987 | Hugues et al. . |
| 4,682,366 | 7/1987 | Ausnit et al. . |
| 4,699,607 | 10/1987 | Lambrecht . |
| 4,731,911 | 3/1988 | Gould . |
| 4,736,496 | 4/1988 | Fisher et al. . |
| 4,741,789 | 5/1988 | Zieke et al. . |
| 4,744,674 | 5/1988 | Nocek . |
| 4,755,248 | 7/1988 | Geiger et al. . |
| 4,756,629 | 7/1988 | Tilman et al. . |
| 4,835,835 | 6/1989 | Gould . |
| 4,846,585 | 7/1989 | Boeckmann et al. . |
| 4,846,586 | 7/1989 | Bruno . |
| 4,854,017 | 8/1989 | Kamp . |
| 4,863,285 | 9/1989 | Claxton . |
| 4,892,414 | 1/1990 | Ausnit . |
| 4,894,975 | 1/1990 | Ausnit . |
| 4,907,321 | 3/1990 | Williams . |
| 4,927,271 | 5/1990 | Branson . |
| 4,930,905 | 6/1990 | Sharps, Jr. . |
| 4,947,525 | 8/1990 | Van Erden . |
| 4,985,192 | 1/1991 | Roeder et al. . |
| 5,012,561 | 5/1991 | Porchia et al. . |
| 5,022,530 | 6/1991 | Zieke . |
| 5,033,868 | 7/1991 | Peppiatt . |
| 5,053,091 | 10/1991 | Giljam et al. . |
| 5,063,069 | 11/1991 | Van Erden et al. . |
| 5,066,444 | 11/1991 | Behr . |
| 5,092,684 | 3/1992 | Weeks . |
| 5,094,707 | 3/1992 | Bruno . |
| 5,100,000 | 3/1992 | Huseman . |
| 5,118,202 | 6/1992 | Bruno . |
| 5,152,613 | 10/1992 | Herrington, Jr. . |
| 5,186,543 | 2/1993 | Cochran . |
| 5,192,135 | 3/1993 | Woods et al. . |
| 5,259,904 | 11/1993 | Ausnit . |
| 5,309,698 | 5/1994 | Huseman . |
| 5,366,294 | 11/1994 | Wirth et al. . |
| 5,372,428 * | 12/1994 | Bruno et al. .............................. 383/5 |
| 5,382,094 | 1/1995 | Ausnit . |
| 5,411,692 | 5/1995 | DiPietro et al. . |
| 5,417,495 | 5/1995 | Branson . |
| 5,419,437 | 5/1995 | Huseman . |
| 5,425,216 | 6/1995 | Ausnit . |
| 5,711,609 * | 1/1998 | Simonsen .............................. 383/5 X |
| 5,957,584 * | 9/1999 | Lakey ................................ 383/201 X |
| 6,004,032 * | 12/1999 | Kapperman et al. .................... 383/5 |
| 6,012,844 * | 1/2000 | Huseman et al. .................... 383/5 X |

* cited by examiner

RECLOSABLE PLASTIC BAG WITH NON-PERFORATED TEAR ZONE

CROSS-REFERENCE TO RELATED APPLICATION

This Continuation-In-Part Application claims the benefit of earlier filed U.S. Patent Application Ser. No. 08/604,851 filed Feb. 22, 1996, now abandoned.

BACKGROUND OF THE INVENTION

Reclosable plastic bags are used for many purposes, including as biohazard specimen bags for secondary specimen containment in hospitals and laboratories. Even though a biohazard specimen bag must be discarded after being filled with biohazardous material, reclosable bags are commonly preferred to other available bags because of numerous characteristics, including that they are spill resistant, easy to fill and close, easy to reopen for access without compromise of integrity when closed, and may be adapted to be fitted with a tamper evident closure means.

In the laboratory or hospital setting, a specimen of blood, urine, or other biological fluid or tissue is typically first placed in a primary container, such as a tube, vial, or other suitable container, and then placed in the biohazard specimen bag for secondary containment, handling, and, if desired, identification. When filled with a specimen, the reclosable biohazard specimen bag may typically be sent to a destination, such as a pathology laboratory for testing or examination of the specimen.

A conventional, typical biohazard specimen bag may be a reclosable plastic bag with a zip action locking reclosable closure profile that reduces the likelihood of inadvertent compromise or opening, such as from pressure created by changes in the contents. Because of the locking nature of the two interlocking parts or elements of the closure profile, the bag typically will open only if the laboratory worker firmly grasps with both hands the lips of the reclosable bag, created above the closure means, and pulls them apart in opposite directions using both hands.

Generally, however, the laboratory worker, often a pathologist or laboratory technician, wears latex or other suitable protective gloves when handling the bag and/or its contents as protection from possible infectious agents or pathogens, such as bacteria or virus. There is presently a heightened sensitivity to the protection of laboratory workers, especially in light of the recent identification of numerous viral pathogens for which there is no cure, e.g. HIV, HSV, and Ebola. That concern has spurred many rules and regulations regarding the procedures that testing laboratories must follow in handling biospecimens, including wearing protective gloves. The laboratory worker's use of protective gloves may present difficulty in opening the closure means. Often, forceful and excessive pulling of the two lips of the closure means causes sudden opening of the bag and/or tearing along the side seal area. In addition, the contents of the bag may fall out, often breaking or damaging the sealed integrity of the primary container, resulting in contamination of the specimen or the laboratory, and attendant risk to laboratory workers.

Because of the difficulty in opening the reclosable closure means, and the fact that the bag will likely not be reused in any event, many laboratory workers do not bother opening the closure means. Instead, they may cut the bag to reach its contents. While cutting the bag certainly facilitates reaching the bag's contents, the use of a blade presents another opportunity for health hazards and contamination.

The laboratory worker may cut, puncture or injure a hand or finger in the process of cutting the bag. Perforated bags may also be opened without opening the reclosable closure means, but the perforations allow air to enter the bag and also allow the contents to spill or leak from the bag. Because of their decreased structural integrity, perforated bags are not suited for containing biohazardous materials. Perforated bags also may permit tampering with the bag's contents more readily than non-perforated bags, as the perforations may present potential paths of access to the bag's interior without substantial visual damage or alteration to the bag.

SUMMARY OF THE INVENTION

The present invention provides reclosable plastic bags which retain structural integrity when closed, but which can be opened conveniently and relatively safely, even by a laboratory worker who is wearing gloves. Unlike conventional reclosable bags that can be difficult to open while wearing gloves, the present bags contain at least one thin section that can act as a "tear zone" for easy opening, without having to open the closure means. Although the reclosable bags of the present invention can be torn, they do not require perforations to be torn. The reclosable bags of the present invention thus satisfy the structural and functional requirements of hospitals and laboratories, without presenting any risk to the user. Moreover, the reclosable bags of the present invention reduce the likelihood that the contents will spill due to a user being encumbered with gloves trying to access the contents of the bag, because the user will not have to pull as hard as with a conventional bag.

The reclosable plastic bags of the present invention can be made from an extruded plastic bag film web. The bag film web can be cut or otherwise formed into a bag comprising a first wall on which a first closure profile element is disposed and a second wall on which a second closure profile element is disposed. On either wall or both walls, below the closure profile element, the plastic film web can be formed into subsections having different thicknesses. At least one of the subsections is thinner in cross-section, formed of a thinner bag film web, thus creating a "tear zone" that optionally can be made with a substantially linear, not substantially cross-linked, molecular alignment. A sufficient distance from the centerline of the thin subsection, on either side or both sides of the thin subsection, one or more reinforcing strips can be formed of sufficient mass, weight, or strength to reduce at least partially the lateral forces that might otherwise act in or on the thin section during extrusion to cause unacceptable wrinkling of the thin section and/or surrounding sections.

Because of the "tear zone" of the reclosable bags of the present invention, laboratory personnel can be more efficient in opening biohazard bags, which can increase the overall efficiency of the laboratory and provide overall operating costs savings. In addition, the reclosable bags of the present invention are inexpensive to manufacture, and can be produced in a variety of methods, further increasing the bag' desirability. The tear zone preferably does not include any perforations, thereby eliminating or reducing the above-mentioned disadvantages presented by perforated bags.

The reclosable bags of the present invention can also be adapted to include one or more ribs that can contact the outer surfaces of closure profile elements to create at least a partial seal. Such ribs would thus further seal the bag and prevent the contents of the bag from leaking or spilling from the bag, and further prevent the contents from coming into contact with ambient air.

Because there may be unacceptable lateral stresses created in the thin section of polymeric material during extrusion, the present invention optionally also provides reinforcing strips that can be simultaneously extruded or otherwise formed onto a wall of the bag, a sufficient distance from the centerline of the thin section, to reduce the lateral stresses that can otherwise cause undesirable wrinkling of the thin section. A strip is preferably of sufficient mass, weight, or strength to reduce the lateral forces acting in the thin section sufficiently, or can be coupled with other strips. A strip can be extruded by a separate extruder or can be formed integrally with the material of the bag by the use of cavities in the die plates.

Such a strip can be formed in the interior or exterior surfaces of the bag film, can be used to balance the weight of the profile element nearest the thin section, can be formed in balanced pairs, can be integral with the bag film or fused after the bag film is made, and can be formed from the same material as the bag film or from different material. The strips are thus extremely flexible and inexpensive to create. The strip can also be positioned in different places, so long as the lateral forces acting within the thin section of the bag are reduced and unacceptable wrinkling is diminished.

In conjunction with the thin section, the strips can help define the tear zone. Therefore, the optional strips of the present invention can substantially prevent the user from tearing the bag in such a way as to cause the contents to spill or fall from the bag. The strips can, therefore, serve dual functions (initially during the extrusion process, and subsequently during the use of the finished bag by a user wearing gloves).

Of course, optionally a second thin section can also be formed on the surface of the first or second walls. In the case a second thin section, it may be desirable to form the thin section on the same wall as the first thin section, or on the second wall. If the second thin section is formed on the same wall as the first thin section, there may be multiple tear zones from which the user may chose. If the second thin section is formed on a corresponding section of the second wall, the bag may be easier to tear than with only one thin section.

In a preferred form, the present invention comprises a reclosable bag including first and second wall panels, each having a top, a bottom, and first and second side edges. The bottom and first and second side edges of the first wall are joined to the bottom and first and second side edges, respectively, of the second wall to form a bag having an openable mouth. The reclosable bag preferably also includes a reclosable closure adjacent the openable mouth, having a first closure element adjacent the top of the first wall panel and an interengaging second closure element adjacent the top of the second wall panel. The reclosable bag preferably also includes an unperforated tear zone in said first wall panel, the tear zone having a thin section with a thickness less than adjacent sections of the wall panel, and extending substantially across the wall panel between the first and second side edges opposite the closure element from the top.

According to further preferred and optional aspects of the present invention, the first wall panel includes a first reinforcing strip adjacent the thin section. The first reinforcing strip preferably extends between the first and second side edges of the first wall panel, generally parallel the thin section and opposite the thin section from the top. The thin section is preferably located approximately midway between the first reinforcing strip and the closure element of the first wall panel. In further preferred and optional aspects, a second reinforcing strip is provided opposite the thin section from the first reinforcing strip. The thin section is preferably approximately midway between the first reinforcing strip and the second reinforcing strip. A second unperforated tear zone can optionally be provided in the second wall panel, located to be substantially aligned with the unperforated tear zone in the first wall panel. A third wall panel can optionally be joined to one of the first and second wall panels to form a document pouch. According to still further preferred aspects of the present invention, the thin section has a thickness at least 0.5 mils less than adjacent sections of the wall panel, and the thin section has a substantially linear molecular alignment.

In another preferred aspect, the present invention is a reclosable bag having a first wall with a top, a bottom, first and second sides, a first closure element adjacent the top, and an unperforated tear zone comprising a thin section extending between the first and second sides opposite the closure element from the top. The reclosable bag preferably further includes a second wall joined to the first wall to form a bag having an openable mouth, the second wall having a second closure element adapted to releasably engage the first closure element to close the openable mouth.

According to further preferred and optional aspects of the present invention, the first wall further includes a first reinforcing strip adjacent the thin section. The first reinforcing strip preferably extends generally parallel the thin section and opposite the thin section from the top. The thin section is preferably located approximately midway between the first reinforcing strip and the first closure element. A second reinforcing strip can optionally be provided opposite the thin section from the first reinforcing strip. The thin section is preferably located approximately midway between the first reinforcing strip and the second reinforcing strip.

In another preferred aspect, the present invention is a reclosable bag formed from an extruded sleeve to have a first wall panel and a second wall panel. The first wall panel preferably includes a first closure element and the second wall panel preferably includes a second closure element adapted to releasably engage the first closure element. The first wall panel preferably further includes a tear zone formed by extruding a portion of the sleeve to form a thin section having a thickness less than adjacent portions of the sleeve.

According to further preferred and optional aspects of the present invention, the thin section of the reclosable bag extends generally parallel to the first closure element, whereby a portion of the bag including the first and second closure elements can be detached from the remainder of the bag by tearing through the tear zone. The tear zone optionally further includes a first reinforcing strip extruded onto the first wall panel adjacent the thin section, opposite the first closure element. The tear zone optionally further includes a second reinforcing strip extruded onto the first wall panel between the thin section and the first closure element.

In preferred embodiments, the present invention provides an inexpensive, efficient, and safe reclosable bag that may be torn open by a user wearing protective gloves. In other preferred aspects, the present invention provides ribs that may act in concert with the closure profile elements to further seal the contents of the bag from outside exposure, leakage, or spillage.

These and other objects, features, and advantages of the present invention will be readily apparent to those of ordinary skill in the art with reference to the remainder of the document.

DESCRIPTION OF THE PREFERRED EMBODIMENT

The present invention includes novel reclosable plastic bags, closure profiles therefor, die assemblies, and methods of manufacture. Various developments in the reclosable plastic bag art are disclosed by U.S. Pat. No. Re. 28,959, U.S Pat. No. Re. 28,969, U.S. Pat. No. Re. 29,208 and U.S. Pat. No. Re. 26,991, all of which are hereby incorporated by reference in their entireties for background information relating to reclosable plastic bags, including closure elements, die assemblies, suitable materials, and methods of manufacture.

Figure 9:
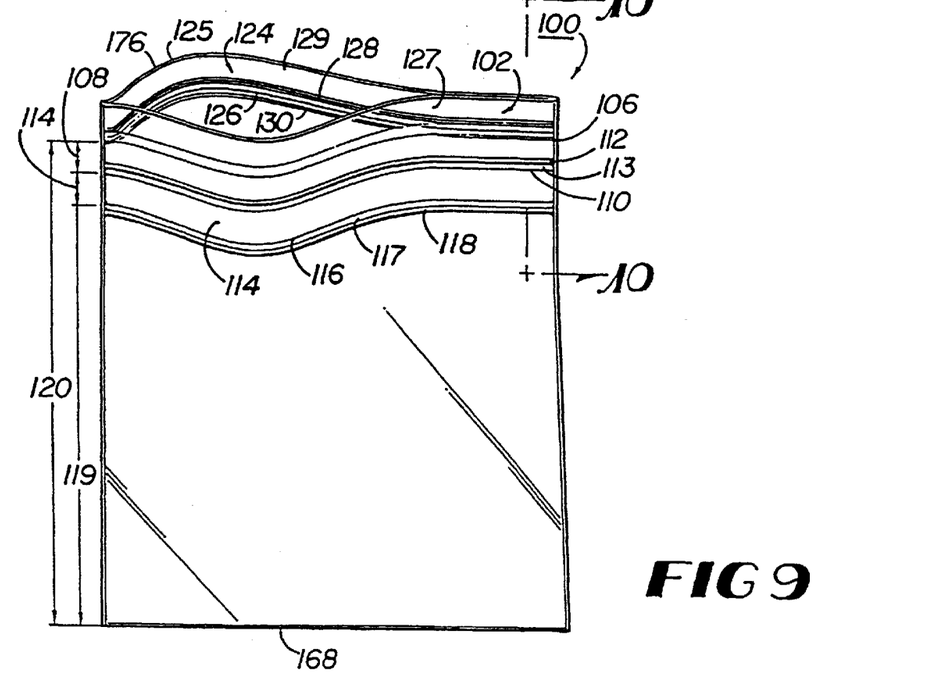
FIG. 9 is a perspective view of one embodiment of a reclosable bag according to the present invention.
Figure 12:
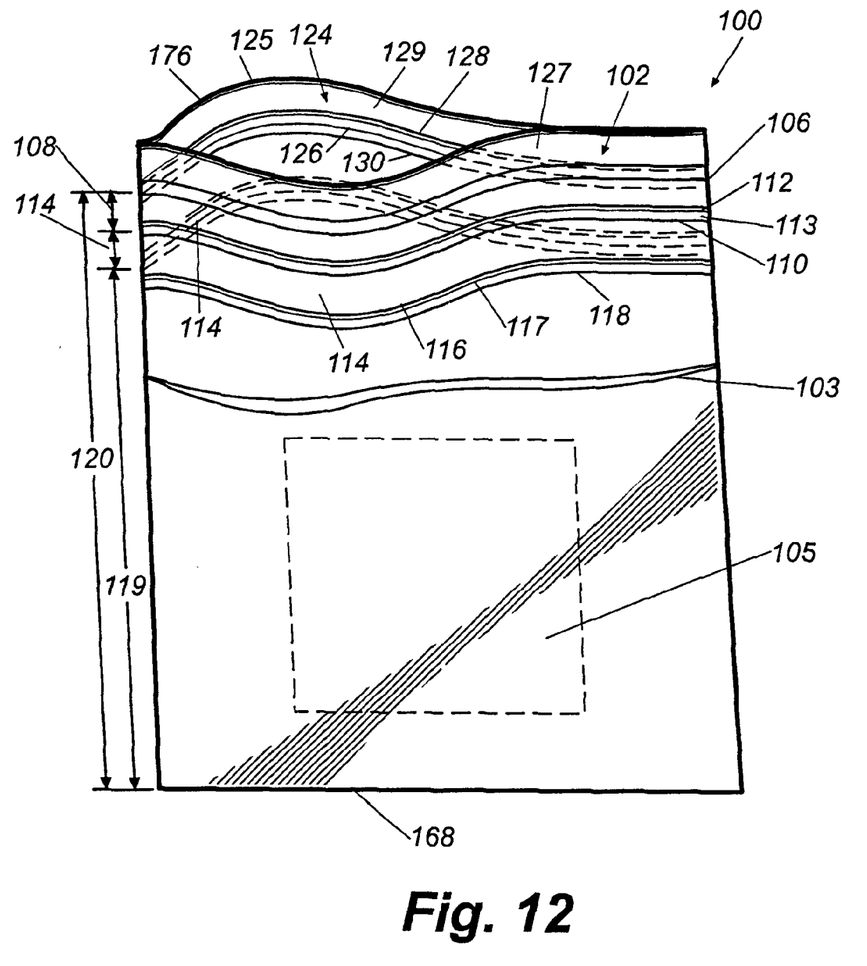
FIG. 12 is a perspective view of another embodiment of a reclosable bag according to the present invention.

FIG. 9 shows a perspective view of a first embodiment of reclosable bag 100 according to the present invention. Bag 100 may be formed from first and second wall panels 102 and 124 in which at least one wall includes a non-perforated thin section 114, thereby creating a "tear zone." FIG. 12 shows first and second wall panels 102 and 124, each having a non-perforated thin section 114. Bag 100, if desired, may contain more than two wall panels, such as in instances where double-wall thickness is desired, or when a third wall panel 103 is provided to form a document pouch for holding papers or identifying material 105, as shown in FIG. 12. Suitable materials from which to form the bags include low density polyethylene, polypropylene, or other suitable polymeric materials. The preferred material is low density polyethylene. In addition to the decreased thickness of thin section 114, the molecular structure of the polymeric resin material may align in a substantially linear fashion in the thin section 114. In the remainder of bag film web 164, the polymeric material may be cross-oriented or bi-oriented. The linear orientation may make the thin section of the wall easier to tear, and may further aid in defining the tear zone. First wall 102 extends to and forms top edge 176, bottom edge 168, and first and second side edges 166 and 170. Lips 127 and 129 are defined between each of the profile elements and top edges 125 and 176 of associated walls 102 and 124. The second wall 124 is similarly configured, having a top, a bottom, and first and second sides. The bottoms and respective first and second sides of the first and second wall panels 102, 124 are joined to form an open-top bag. An openable mouth defined between lips 127, 129 communicates with the interior of the bag. A lower section 120 may be defined by the profile element of first wall 102 and bottom edge 168 of first wall 102, wherein the lower section may be formed into first, second, and third subsections, 108,114, and 119, respectively. The three subsections have first, second, and third thicknesses, respectively, and extend to and from top, bottom, and side edges.

Figures 10, 11:
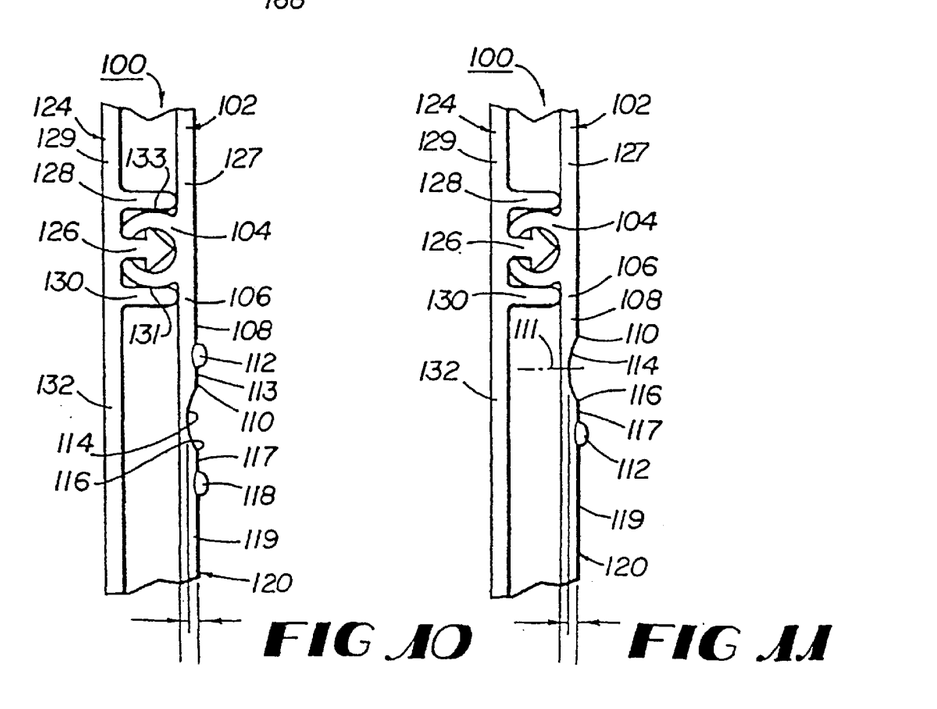
FIG. 10 is a fragmentary cross sectional view of a portion of the bag depicted in FIG. 9 according to the present invention.
FIG. 11 is a fragmentary cross sectional view of a portion of another embodiment of the reclosable bag according to the present invention.

FIG. 10 shows a fragmentary cross section view of a portion of a first embodiment of bag 100 of the present invention. Interengaging first and second closure profile elements 104 and 126 are preferably formed on walls 102 and 124 to form a reclosable closure. Lips 127 and 129 are preferably defined between each of profile elements 104 and 126 and top edges 125 and 176 of associated walls 102 and 124. Lower section 120 may be defined by the profile element 104 of first wall 102 and bottom edge 168 of first wall 102, wherein the lower section may be formed into first, second, and third subsections, 108, 114, and 119, respectively.

The absolute thicknesses may be varied substantially for different reclosable plastic bag uses, but thin section 114 must be present to define a tear zone without perforations or microperforations that would not be suitable for biohazard material. Although first and third subsections 108 and 119 need not be of the same thickness, the first and third thicknesses should be greater than the second thickness. Thus, the thickness of the thin section 114 is less than adjacent sections of the wall panel 102. In one embodiment, the first and third thicknesses are substantially about 2.5 mils, and the second thickness may be substantially about 2.0 to 1.5 mils, roughly 0.5 to 1.0 mils less than the first thickness. The tear zone preferably extends substantially across the wall panel 102, between the first and second side edges 166, 170.

First subsection 108 may be defined by bottom edge 106 of profile 104/126 and top edge 110 of second subsection 114. Third subsection 119 may be defined by bottom edge 116 of second subsection 114 and bottom edge 168 of first wall 102. As further discussed below, the reclosable plastic bags of the present invention may have closure profile elements 104 and 126 integral with walls 102 and 124, or profile elements that are fused onto walls 102 and 124 after the bag film web is extruded.

Using any appropriate method for forming reclosable plastic bags, including those discussed below, the present invention involves the creation of a thin second subsection 114 in bag film web 164. Because thin section 114 will have a different weight in the extruding column 215, shown in FIG. 1, lateral stresses created during extrusion may tend to cause thin section 114 to collapse, wrinkle, or buckle in an unacceptable manner, resulting in an unusable product. To compensate for the unbalanced lateral stresses created in thin section 114 during extrusion, one or more reinforcing strips 112 and/or 118 of sufficient mass to reduce such lateral stresses are optionally formed near or adjacent thin section 114.

In the embodiment depicted in FIG. 10, strips 112 and 118 may be formed from the same type of polymeric material as the remainder of the bag or from another material of a different density or molecular structure, so long as that second material adheres sufficiently to the first polymeric material. One may desire strips of a different color, and the strips can be provided in that manner. One or more strips provide added weight and strength to thin section 114 and also define the tear zone to some extent. If one is only forming one strip, as depicted in FIG. 11, the closure profile element 104 of associated wall 102 may completely or partially balance the weight and strength of first strip 112. The strip may be lighter or heavier than the closure element, but may simply partially balance its weight and strength. By at least partially balancing the relative masses, weights and strengths of first strip 112 and profile element 104, and the relative distances between first strip 112, closure profile element 104, and centerline 111 of thin section 114, one may be able adequately to reduce lateral stresses acting in thin section 114. The first strip 112 and the profile element 104 also serve to define the tear zone to some extent.

In the embodiment depicted in FIG. 10, strips 112 and 118 may be formed from the same type of polymeric material as the remainder of the bags or from another material of a different density or molecular structure, so long as that second material adheres to the first polymeric material. Strips 112 and 118 can, of course, themselves be formed of different materials, if desired. Strips 112 and 118 provide added weight and strength to thin section 114 and also define the tear zone to some extent. If one is forming two strips, as depicted in FIG. 10, first strip 112 and second strip 118 may completely or partially balance their respective weights and strengths. By at least partially balancing the relative masses, weights and strengths of first strip 112 and second strip 118, and the relative distances between first strip 112, second strip 118, and centerline 111 of thin section 114, one may be able adequately to reduce lateral stresses acting in thin section 114 to substantially prevent unacceptable wrinkling of the thin section during extrusion.

Figure 1:
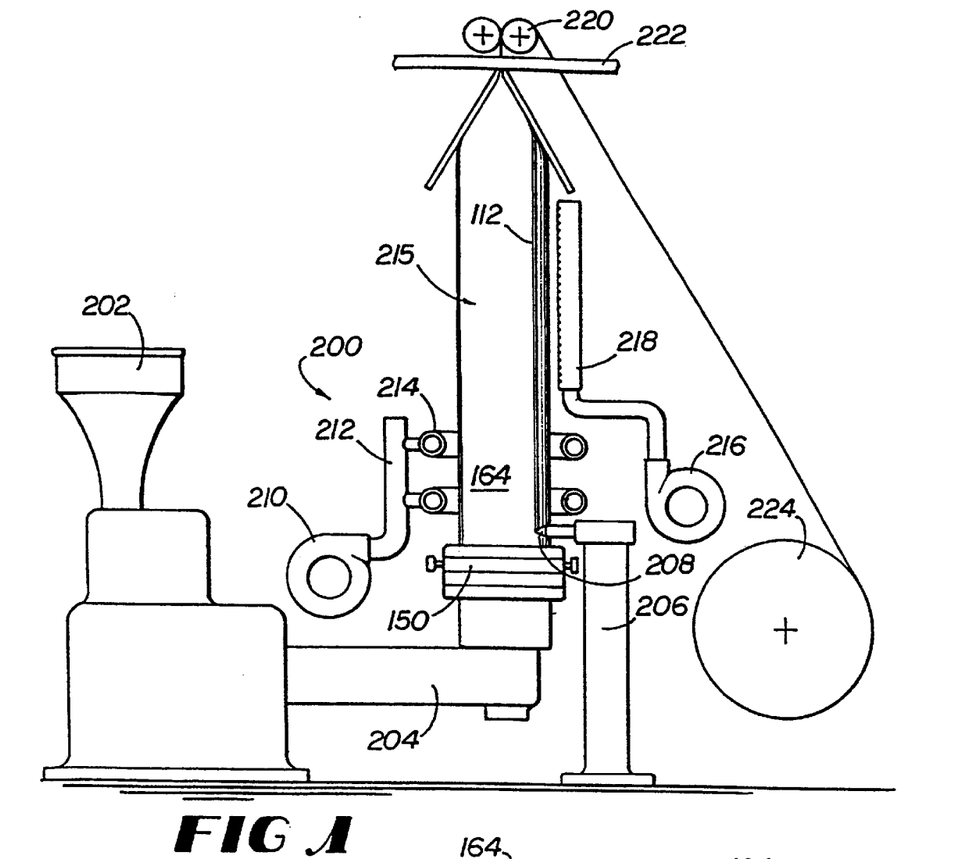
FIG. 1 is a schematicized elevational view of one form of the apparatus for producing bags according to the preferred embodiment of the present invention.
Figure 3:
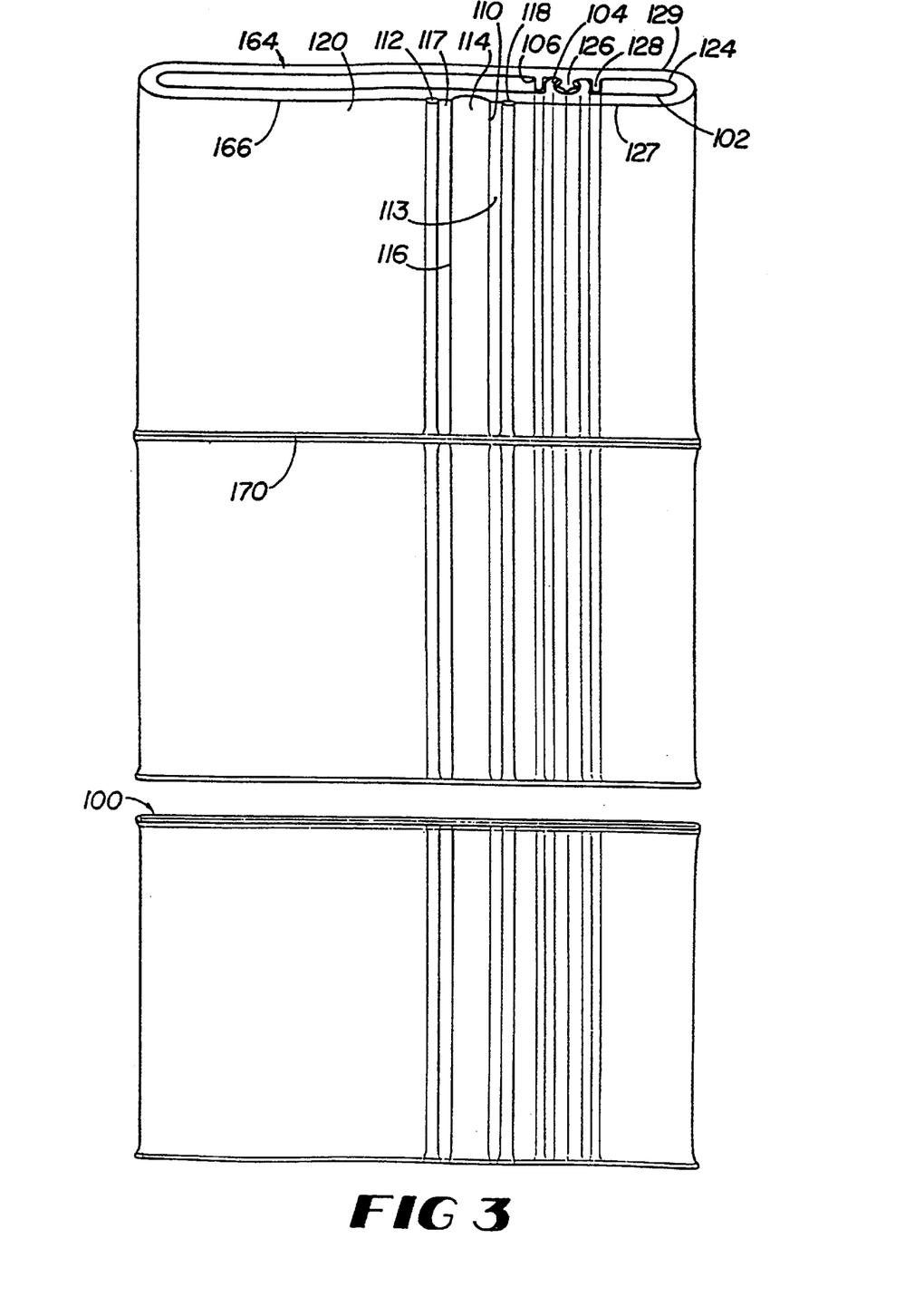
FIG. 3 is a side view of one embodiment of folded, extruded material according to the present invention.

FIG. 1 shows a schematicized elevational view of a first embodiment of an apparatus of the invention. After bag film web 164 has been shaped by die assembly 150, one or more strips may each be extruded from nozzle 208 of extruder(s) 206, for the associated strip, onto outside surface 158 of bag film web 164. The extruded strip should be at a temperature sufficient for the extruded strip substantially to adhere to the bag film web 164. The strips may be extruded onto either or both edges 110 and 116 of second subsection 114, or may be spaced apart from the edges of second subsection 114 by distances 113 and 117 (shown in FIGS. 3, 10, and 11). In the latter embodiment, the strips would actually be on outside surface 158 of first and third subsections 108 and 119 of lower section 120.

Alternatively, first and/or second strips 112 and 118 may be formed integral with the bag film web. First and/or second strips 112 and 118 may be simultaneously extruded with the bag film web on the inside surface 160 or outside surface 158, or alternatively may be formed on the inside surface 160 or outside surface 158 of lower section 120 after the bag film is extruded from space 154. Integral first and second strips 112 and 118 may be formed on the outside surface 158 or inside surface 160 of lower section 120. In addition to the discussed permutations, the disclosed reclosable plastic bag could be also be made with a thin section on lower section 132 of second wall 124 such that the second thin section generally corresponds in dimensions and placement with thin section 114. If a thin section is used on second wall 124, further strips of sufficient mass to reduce lateral stresses acting on the second thin section could be formed on the inside or outside surfaces of second wall 124. Those strips could be extruded onto the outside surface of second wall 124, or could be formed integral with either the inside 160 or outside 158 surfaces of first wall 102 using cavities in the associated component of the die assembly.

It may be possible to make first subsection 108 the thin section. However, there may be a certain amount of thickness inherently produced in walls 102 and 124 proximate and adjacent to closure profile elements 104 and 126 when those elements are extruded integral with bag film web 164. In that case, it may be difficult to avoid having a thicker section immediately adjacent to closure profile elements 104 and 126, and forming thin section 114 lower on lower section 120 may be desirable, after the inherent thickness proximate to elements 104 and 126 decreases to or below the desired first thickness.

In addition to the combination of thin section 114 and first and/or second strips 112 and 118, the present invention includes novel closure profiles. FIGS. 10 and 11 are fragmentary cross sectional views of a portion of bag 100. Conventional, interlocking closure profile elements are fully described in Naito, U.S. Pat. No. Re. 28,969 and Uramoto, U.S. Pat. No. Re. 33,674, which are incorporated herein by reference, and include male element 126 and female element 104, both of which are designed and shaped to be interlocking in such a manner that bag 100 may be opened from the outside, while resisting opening from the pressures created by the contents. Of course, it will be understood that the reverse configuration, wherein the first closure element 104 comprises a male element on the first wall panel 102, and the second closure element 126 comprises a female element on the second wall panel 124, is equally within the scope of the present invention.

The present invention uses conventional reclosable closure profiles, as discussed by Naito and Uramoto, and optionally adds one or more ribs 128 or 130 to the closure profile so as to increase the structural integrity and sealing ability of the closure profile. Rib 130 at least partially prevents the contents of bag 100 from coming into contact with closure profile elements 104 and 126, and rib 128 at least partially prevents ambient elements, air, moisture, etc., from contacting closure profile elements 104 and 126.

In a preferred embodiment, rib 130 extends from one wall 124 to contact inside surface 160 of the other wall 102 and lower outside surface 131 of element 104 to form at least a partial seal between rib 130, closure profile element 104, and wall 102. Rib 128 extends from wall 124 to contact the inside surface of wall 102 and upper outside surface 133 of element 104 to form at least a partial seal between rib 128, closure profile element 104 and wall 102. As described below, ribs 128 and 130 may be formed integral with bag film web 164 by the creation of further cavities in interior die plate 152, or can be fused in desired positions.

Figure 2:
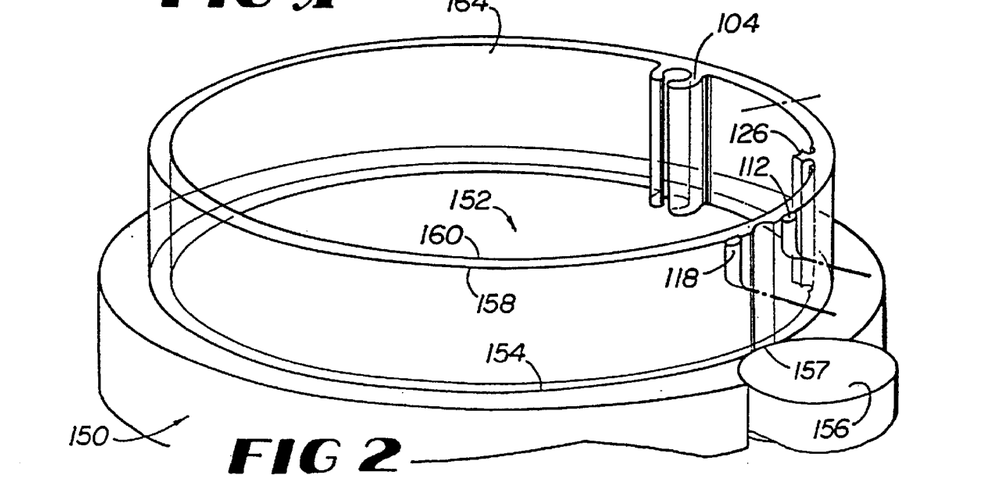
FIG. 2 is a fragmentary perspective view of one embodiment of a die assembly of the present invention with a portion of material being extruded therefrom.
Figures 4, 5, 6, 7, 8:
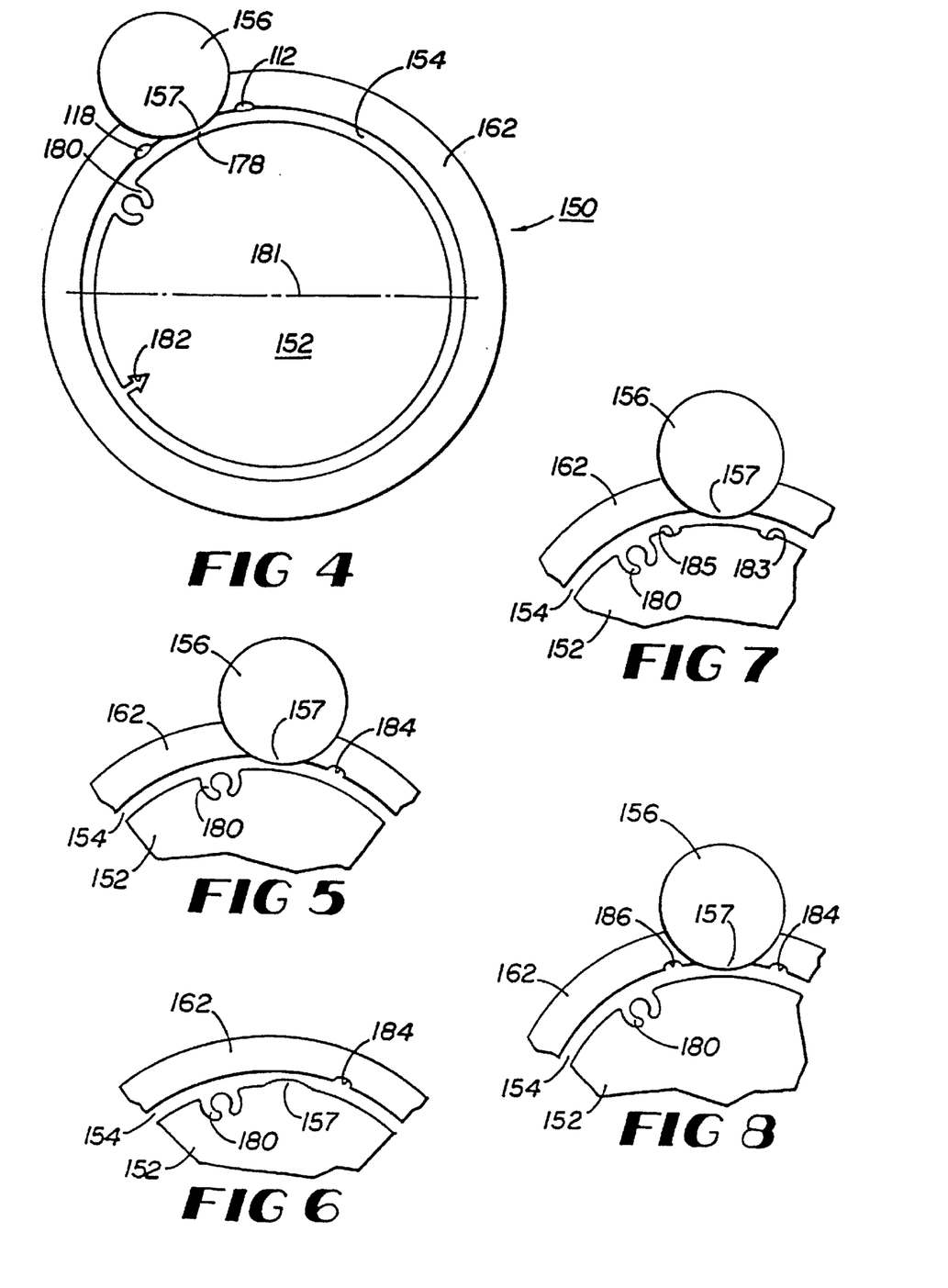
FIG. 4 is a top plan view of one embodiment of a die assembly according to the present invention.
FIG. 5 is a fragmentary top plan view of another embodiment of a die assembly according to the present invention.
FIG. 6 is a fragmentary top plan view of another embodiment of a die assembly according to the present invention.
FIG. 7 is a fragmentary top plan view of another embodiment of a die assembly according to the present invention.
FIG. 8 is a fragmentary top plan view of another embodiment of a die assembly according to the present invention.

FIG. 2 shows a fragmentary perspective view of one embodiment of a die assembly of the invention with a portion of material being extruded therefrom. Bag film 164 is depicted with closure profile elements 104 and 126 and strips 112 and 118 being extruded on outer surface 158. FIG. 4 shows a top plan view of a first embodiment of a die assemblies of the present invention. Conventional die assemblies for forming reclosable plastic bags are described fully in Naito, U.S. Pat. No. Re. 29, 208 and Geiger and Kain, U.S. Pat. No. 4,755,248, which are incorporated herein by reference. The present die assembly uses exterior die 162 and interior die plate 152 to create space 154 between die assembly components 152 and 162. The phrases "die plate" and "die" are used solely for purposes of clarity, can be used interchangeably, and are not intended to distinguish die assembly components absent a qualifier such as "interior," "exterior," or "tangential." The space 154 may be narrowed in section 178 by protrusion 157 which extends into space 154. Narrowed section 178 creates thin section 114 of bag film 164 when the polymeric material is channeled through space 154, thereby creating a tear zone.

Protrusion 157 extends into space 154 from exterior die 162. Protrusion 157 may be integral with interior die plate 152 or exterior die 162, or may be a separate die component, such as tangential die plate 156. Tangential die plate 156 may reside partly within exterior die 162, or may be affixed to the surface of the die component in contact with space 154. Tangential die plate 156 may be fixed or may be adjustable to adjust or optimize the thickness of thin section 114. In the first embodiment of the die assemblies depicted in FIG. 4, strips 112 and 118 are shown, but would be extruded onto the outside surface the bag film after extrusion of the bag film.

FIG. 5 depicts a second embodiment of a die assembly of the present invention. Protrusion 157 extends into space 154 from exterior die 162. Protrusion 157 may be integral with interior die plate 152 or exterior die 162, or may be a separate die component, such as tangential die plate 156. Tangential die plate 156 may reside partly within either of die assembly components 152 or 162, or may be affixed to the surface of either die component in contact with space 154. Tangential die plate 156 may be fixed or may be adjustable to adjust or optimize the thickness of thin section 114. Exterior die 162 also includes a first cavity 184 to form strip 112 integral with outside surface 158 of bag film web 164.

FIG. 6 depicts a third embodiment of a die assembly of the present invention. Protrusion 157 extends into space 154 from interior die plate 152. Protrusion 157 may be integral with interior die plate 152, or may be a separate die component, such as a tangential die plate. A tangential die plate may reside partly within die assembly component 152, or may be affixed to the surface of the die component in contact with space 154. Tangential die plate 156 may be fixed or may be adjustable to adjust or optimize the thickness of thin section 114. Exterior die 162 may also include a first cavity 184 to form strip 112 with outside surface 158 of bag film web 164.

FIG. 7 depicts a fourth embodiment of a die assembly of the present invention. Protrusion 157 extends into space 154 from exterior die 162. Protrusion 157 may be integral with exterior die 162, or may be a separate die component, such as tangential die plate 156. Tangential die plate 156 may reside partly within die assembly component 162, or may be affixed to the surface of the die component in contact with space 154. Tangential die plate 156 may be fixed or may be adjustable to adjust or optimize the thickness of thin section 114. Interior die plate 152 may also include third and fourth cavities 183 or 185 to form strips 112 or 118 integral with inside surface 160 of bag film web 164.

FIG. 8 depicts a fifth embodiment of a die assembly of the present invention. Protrusion 157 extends into space 154 from exterior die 162. Protrusion 157 may be integral with exterior die 162, or may be a separate die component, such as tangential die plate 156. Tangential die plate 156 may reside partly within the die assembly component 162, or may be affixed to the surface of either die component in contact with space 154. Tangential die plate 156 may be fixed or may be adjustable to adjust or optimize the thickness of thin section 114. Exterior die 162 may also include first and second cavities 184 or 186 to form strips 112 or 118 integral with outside surface 158 of bag film web 164.

As depicted in FIGS. 4 through 8, there are numerous variations and combinations of die assembly components and cavities. In all cases, the interior or exterior die components can be formed to create a protrusion that will produce the desired tear zone in the bag film to allow a user to access the contents without opening the closure means. Alternatively, separate die components can be fixed, either permanently or adjustably, within either the interior or exterior die components to create a protrusion that will produce the desired tear zone in the bag film. Also as depicted in FIGS. 4 through 8, there are numerous variations and combinations of cavities that can be formed in the interior or exterior die components to form strips of sufficient weight, strength, or mass to reduce sufficiently lateral forces that may act in the thin section during extrusion. The strips may reduce the lateral forces sufficiently to allow extrusion substantially without lateral forces that may otherwise cause undesirable wrinkling in the thin section.

Several fundamental approaches for forming conventional reclosable bags are described in the patent literature. One approach has been to form the bag film web and the closure profiles in a single extrusion operation. See Ausnit, U.S. Pat. No. 3,338,284; Behr, U.S. Pat. No. 3,852,386; and Naito, U.S. Pat. No. Re. 29,208.

A second approach uses an adhesive, such as a strip of tape or glue, to join a closure profile to a bag film web. For example, Ausnit U.S. Pat. No. 4,101,355 discloses a reclosable bag film forming process in which a web and closure profile are joined by a liquid adhesive supplied by an applicator having a nozzle. After the adhesive is applied, the web and closure profiles are pressed together by a presser roll and a backing roll. See also Ausnit, U.S. Pat. No. 3,226,787.

A third approach involves the use of a pre-formed bag film web and a pre-formed closure profile which are drawn from separate stock rolls. The bag film web and/or closure member are then heated and joined. For example, Howard, U.S. Pat. No. 3,846,209 discloses a method for producing a bag film containing a closure profile wherein a pre-formed plastic film may be fed from a stock roll into a sealing station. A separate closure strip from a second stock roll may be also fed into the sealing station. In the sealing station, the closure strip and plastic film are welded together by a pair of heating bars.

A fourth approach involves the use of a preformed bag film web drawn from a supply roll and joined to a relatively freshly extruded closure profile. For example, Noguchi, U.S. Pat. No. 3,904,468 discloses a method of making a reclosable bag film in which a web of bag film material may be unwound from a stock roll and then transferred to a heating station having a heating roll on which the film may be heated to a desired temperature. The film is then transferred to a heated joining roll at which the film is joined to the freshly extruded fastener profile strips. See also Takahashi, U.S. Pat. No. 4,279,677; and Ferrell, U.S. Pat. No. 4,582,549.

Yano, U.S. Pat. No. 4,555,282, discloses another variation of the fourth approach. Yano discloses a method of bonding a closure profile to a bag film web in which a closure profile having a base portion and a fastener profile portion may be extruded shortly before being bonded to a bag film web. Between the extrusion of the closure profile and its joinder to the bag film web, only the fastener profile portion is cooled, thereby solidifying and stabilizing. The base portion of the profile is left heated, thereby remaining thermoplastic, when the closure profile is joined to the film. Kamp, U.S. Patent No. 4,306,924, discloses another variation on the fourth approach in which the film web is extruded on to a casting roll to join an already formed closure profile.

A fifth approach involves extruding a bag film web and a closure profile in close proximity to each other and joining them to each other shortly after extrusion. For example, Kamp U.S. Pat. No. 4,428,788 discloses a method for forming a reclosable bag wherein a film, a tape, and a closure profile are extruded by three separate dies. The film, tape, and closure profile dies are positioned so that the film, tape, and closure profiles contact each other while still at a temperature of above 200 degree(s) F. A chill roll may be provided for cooling the film, tape, and closure profiles.

Sutrina et al, U.S. Pat. No. 4,295,915, discloses an apparatus for forming a reclosable bag film wherein a fastener profile and its base strip are extruded integrally, and then joined to a film web. The die for extruding the bag film web may be disposed adjacent to the fastener die block so that the fastener profile and bag film are joined shortly after both are extruded. See also Goto, U.S. Pat. No. 3,462,332 and Zieke, U.S. Pat. No. 4,522,678.

Although the discussed patents disclose numerous fundamental methods for forming reclosable bags, and reclosable closure means, there is still room for improvement in the art, and the present improvements are intended to be suitable with any of the methods. It may be possible to use many fundamental methods, to modify or adapt them, and to incorporate the novel aspects of the methods disclosed below.

As discussed above, FIG. 1 is a schematicized elevational view of one embodiment of the apparatus of the invention. As depicted in that apparatus, the preferred method involves supplying polymeric resin material into hopper 202 to be heated and fed into the inlet port of an extruder 200. Any suitable polymeric resin material may be used, and, in the preferred embodiment, the material used may be low density polyethylene. The extruder includes a means that causes the heated polymeric material to travel through the space in die assembly 150 to form bag film web 164. As the polymeric material is channeled into the space, air pressure may be created in the lumen of the extruded tube of bag film web 164 by blowing air from the die assembly 150 into the lumen. That air pressure may help to prevent the heated bag film web 164 from collapsing and having the side walls fuse with each other.

Because the thin section of bag film web 164 will have a different weight in the extruding column 215, lateral stresses created during extrusion may tend to cause the thin section at least partially to collapse, wrinkle, or buckle, resulting in an unusable product. To compensate at least partially for the unbalanced lateral stresses imposed on the thin section during extrusion, one or more strips of sufficient mass to reduce such lateral stresses may be formed on a surface of the bag film web 164, preferably sufficiently near the thin section to aid in the reduction of lateral forces acting thereon. One or more strips may provide added weight and strength to the thin section.

Without undue experimentation, it may be possible to determine whether one, two, or more strips would be appropriate. One could, therefore, compensate and optimize the system for, inter alia, particular extruding apparatus, different fundamental methods of manufacture, and variations in polymeric material being used.

After bag film web 164 has been shaped by die assembly 150, one or more strips may each be extruded from nozzle 208 of extruder(s) 206 for the associated strip onto outside surface 158 of bag film web 164. The extruded strip should be at a temperature sufficient for the extruded strip substantially to adhere to the bag film web 164.

The bag film web 164, now in the form of a tube, may then be moved through a pinch roller, such as 220 in FIG. 1, and then rolled onto a spool, such as 224 in FIG. 1, and fed into an apparatus designed for making bags from bag film web 164. One embodiment of a bag making apparatus involves the use of a hot knife that cuts bag film web 164 and seals reclosable plastic bag 100 to create side wall edges 166 and 170, depicted in FIG. 3. When the hot knife contacts side wall edge 166 of thin section 114, the decreased mass and heat absorbing ability of thin section 114 may result in a concave notch being created in thin section 114. That notch may also facilitate tearing.

The present method of manufacture discloses numerous combinations and placements of strips proximate to thin section 114 to reduce sufficiently the lateral forces acting in thin section 114 during extrusion. Without undue experimentation, it may be possible to implement the present invention to create a wide variety of reclosable plastic bags.

In use, contents are placed into the bag through the mouth, and the first and second closure elements are engaged to close and seal the bag. In order to remove the contents from the bag, a portion of the bag comprising the first and second closure elements is detached from the remainder of the bag by tearing through the tear zone. The tear zone provides a controlled removal of the detached portion, and facilitates removal of the bag's contents even by gloved users.

The present embodiments are included solely to depict variations of the present invention. Pursuant to the disclosures of the present invention, it may be possible to adapt the invention in ways not disclosed herein.

What is claimed is:

1. A reclosable bag comprising:
    (a) first and second wall panels, each having a top, a bottom, and first and second side edges, the bottom and first and second side edges of the first wall panel joined to the bottom and first and second side edges, respectively, of the second wall panel to form a bag having an openable mouth;
    (b) a reclosable closure adjacent the openable mouth, comprising a first closure element adjacent the top of the first wall panel and an interengaging second closure element adjacent the top of the second wall panel; and
    (c) an unperforated tear zone in said first wall panel, said tear zone comprising a thin section having a thickness which is less than adjacent sections of the first wall panel, and extending continuously and substantially across the first wall panel between the first and second side edges and positioned between the bottom and the closure element.

2. The reclosable bag of claim 1, wherein said first wall panel further comprises a first reinforcing strip adjacent the thin section.

3. The reclosable bag of claim 2, wherein the first reinforcing strip extends between the first and second side edges of the first wall panel, is generally parallel to the thin section and is positioned between the bottom and the thin section.

4. The reclosable bag of claim 3, wherein the thin section is approximately midway between the first reinforcing strip and the closure element of the first wall panel.

5. The reclosable bag of claim 2, further comprising a second reinforcing strip opposite the thin section from the first reinforcing strip such that the thin section is between the first and second reinforcing strips.

6. The reclosable bag of claim 5, wherein the thin section is approximately midway between the reinforcing strip and the second reinforcing strip.

7. The reclosable bag of claim 1, further comprising a second unperforated tear zone in the second wall panel, the second unperforated tear zone being substantially aligned with the unperforated tear zone in the first wall panel.

8. The reclosable bag of claim 1, further comprising a third wall panel joined to one of the first and second wall panels to form a document pouch.

9. The reclosable bag of claim 1, wherein the thin section has a thickness which is at least 0.5 mils less than adjacent sections of the wall panel.

10. The reclosable bag of claim 1, wherein the thin section has a substantially linear molecular alignment.

11. The reclosable bag of claim 1, wherein the unperforated tear zone in the first wall panel is formed by extruding a portion of the web in a manner to form a thin section having a thickness less than adjacent portions of the extruded web.

12. A reclosable bag formed from an extruded web comprising a first wall panel and a second wall panel, each of the first and second wall panels comprising a top, bottom, side edges, and a closure elements, said closure elements of the first and second wall panels adapted to releasably engage each other, the first wall panel further comprising a tear zone formed by extruding a portion of the web in a manner to form a thin section having a thickness less than adjacent portions of the extruded web, the tear zone positioned between the bottom and a closure element.

13. The reclosable bag of claim 12, wherein the thin section extends generally parallel to the first closure element, whereby a portion of the bag can be detached from the remainder of the bag by tearing through the tear zone, the portion comprising the first and second closure elements.

14. The reclosable bag of claim 12, further comprising a first reinforcing strip adjacent the thin section and positioned so that the thin section is between the strip and the first closure element.

15. The reclosable bag of claim 14, further comprising a second reinforcing strip adjacent the thin section and positioned between the thin section and the first closure element.

16. The reclosable bag of claim 15, wherein the second reinforcing strip is extruded onto the first wall panel.

17. The reclosable bag of claim, 14, wherein the first reinforcing strip is extruded onto the first wall panel.

18. The reclosable bag of claim 12, further comprising a second tear zone in the second wall panel, the second tear zone being substantially aligned with the tear zone in the first wall panel and formed by extruding a portion of the web in a manner to form a thin section having a thickness less than adjacent portions of the extruded web.

19. The reclosable bag of claim 12, wherein the first and second closure elements are integral with the first and second wall panels.

20. A reclosable bag comprising:
   (a) first and second wall panels, each having a top, a bottom, and first and second side edges, the bottom and first and second side edges of the first wall panel joined to the bottom and first and second side edges, respectively, of the second wall panel to form a bag having an openable mouth;
   (b) a reclosable closure adjacent the openable mouth, comprising a first closure element adjacent the top of and integral with the first wall panel and an interengaging second closure element adjacent the top of and integral with the second wall panel; and
   (c) substantially aligned unperforated tear zones in the first and second wall panels, the tear zones comprising a thin section having a thickness which is less than adjacent sections of the first and second wall panels, and extending continuously and substantially across the first and second wall panels between the side edges and positioned between the bottom and the first and second closure elements, wherein the tear zones are formed by extruding a portion of the web in a manner to form a thin section having a thickness less than adjacent portions of the extruded web.

* * * * *